FIG. I

INVENTORS
NESTOR W. PANDELL
ROBERT W. KNEBEL

INVENTORS
NESTOR W. PANDELL
ROBERT W. KNEBEL
BY
Robert J. Dockery
ATTYS.

United States Patent Office

3,430,480
Patented Mar. 4, 1969

3,430,480
APPARATUS FOR TESTING WEARABILITY OF FABRICS
Nestor W. Pandell, Waccabuc, and Robert W. Knebel, Rochester, N.Y., assignors to Cluett, Peabody & Co., Inc,. Troy, N.Y., a corporation of New York
Filed July 27, 1967, Ser. No. 656,550
U.S. Cl. 73—7                                                  10 Claims
Int. Cl. G01n 3/56, 19/02

ABSTRACT OF THE DISCLOSURE

The abrasion resistance of fabric is tested by striking one side of the fabric with high-velocity abradant particles and determining and recording the time taken for the abradant particles to wear through the fabric. The sensing is done by detecting a pressure change in a closed chamber on the side of the fabric opposite the source of abradant particles.

Background of the invention

In the textile industry, it is very important for manufacturers as well as users of fabrics for such things as clothing articles to have some means of determining the wearing qualities of various fabrics. Determination of wearing characteristics under actual conditions of use presently involves a difficult and protracted evaluation of the fabric while it is actually being put to various end uses. For this reason, it is desirable to have a means for testing fabric wear resistance in a brief time under laboratory conditions and in such a way that the results will show some indication of the wearing qualities of the fabric under actual use conditions. Modern quality control demands such a test.

Various methods are known in the prior art for testing wear resistance of fabrics and a variety of abrasion testers appear in the prior art. In many of the prior art abrasion testers the sample is rubbed against a surface; and, either the strokes required to wear through the sample, or the percentage weight loss of the sample or the abradant surface is measured. For example, in one known abrasion tester, a yieldably mounted emery cloth is used on a wheel. The wheel turns and the emery cloth intermittently rubs against the sample being tested. It is evident that there is some efficiency loss due to a wearing away of the surface against which the sample is rubbed. Since constant efficiency is one necessary criterion for a successful quality control testing program, it is clear that loss of efficiency results in non-uniform test data and inability to compare one test result with another. In the case of this abrasion tester, the emery cloth must be replaced each time; and even this would not be a full solution because the rate of wear would be different depending on the abrasion resistance of the sample being tested.

Summary of the invention

The present invention relates generally to wear testing of fabrics and, more particularly, to a method and apparatus for testing wear resistance of fabrics. Wear resistance is related to surface hardness, often termed abrasion resistance. Abrasion resistance is, in turn, related to durability which is recognized as a primary consideration in quality control particularly in the textile industry.

It is an object of the present invention to provide a method and apparatus for testing the wearability of fabrics.

A further object is to provide an improved method and apparatus for determining wear resistance of fabrics which is adaptable to rapidly testing for such wear resistance.

A further object is to provide an improved method and apparatus whereby wear resistance of fabrics can be determined quickly and without the necessity of pre-conditioning the sample before the test is made.

One feature of the present invention is that tests can be made rapidly on any type of fabric. Another feature is that the invention is adaptable to the determination of a useful abrasion characteristic. The present invention is adaptable to testing and evaluation of a wide range of materials but should prove most useful in testing and evaluating cloth which has been treated with chemicals in order to impart shape retaining characteristics. The reason for this is that the addition of the chemicals, while improving shape retention, at the same time decreases strength and abrasion resistance and makes abrasion testing a critical factor in quality evaluation and control.

To accomplish the foregoing and other objects of the present invention, the invention comprises the features hereinafter described and particularly set out in the claims, the description setting forth in detail, certain illustrative embodiments of the invention. These embodiments are set out to show some of the many ways in which the principles of the invention may be employed.

Description of drawings

The figures are to be understood to be more or less of a diagrammatic character for the purposes of illustration. Like characters identify the various elements in the several views.

Description of invention

Figure 1:
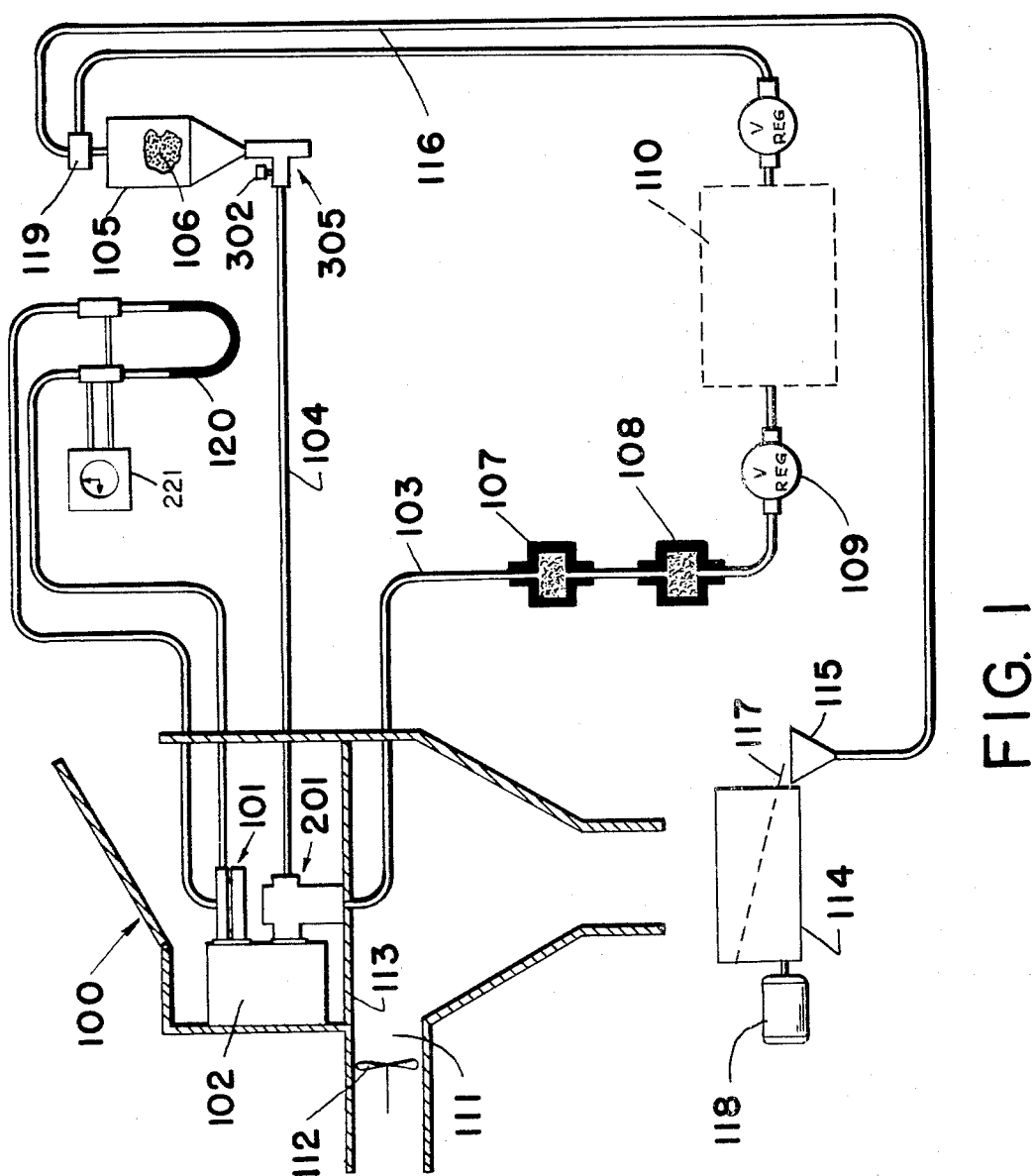
FIGURE 1 is an over-all schematic layout of an apparatus constructed in accordance with the present invention.

FIGURE 1 shows a schematic drawing of one embodiment of an apparatus constructed in accordance with the principles of the present invention.

The apparatus shown in the figure has several basic elements. These include an enclosure 100 which confines a test specimen, mounting means 101 attached to a support member 102, flexible hose lines 103 and 104, a manometer 120 and a reservoir 105 which holds abradant grit 106.

Figure 2:
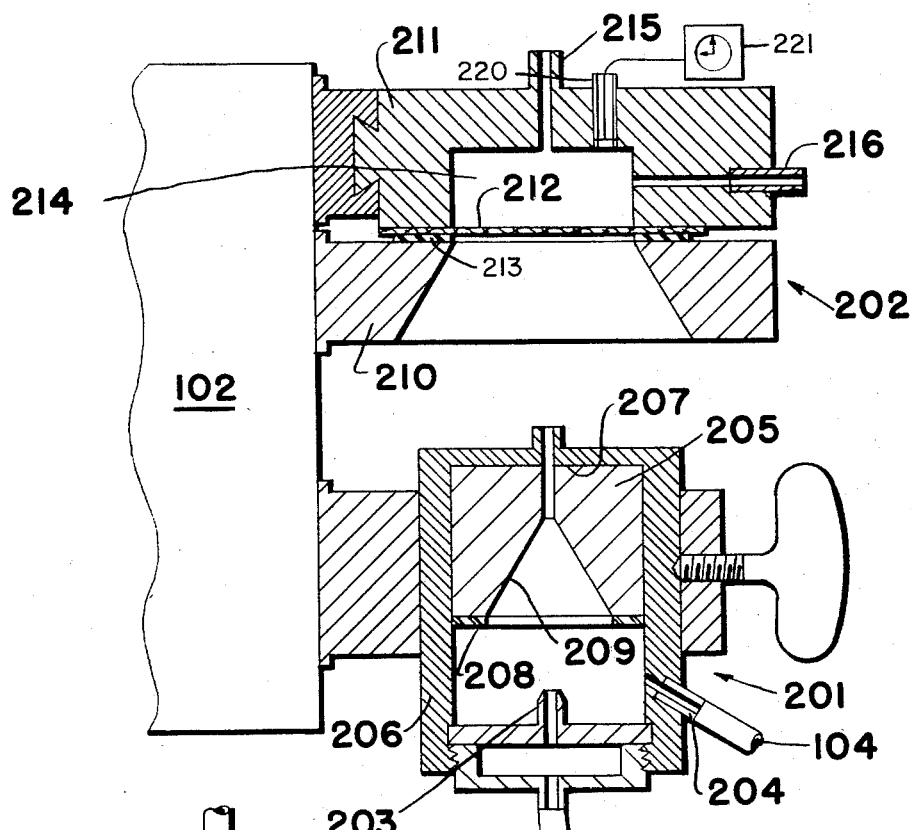
FIGURE 2 is a cross sectional detail of a nozzle and a sample mount both constructed in accordance with the invention.

FIGURE 2 shows the mounting means 101 in detail. The mounting means comprises a nozzle assembly 201 and a specimen or sample mounting assembly 202. The nozzle assembly is comprised principally of three nozzles 203, 204 and 205, positioned in a fitting 206 so as to produce a high pressure stream of abradant laden air which impinges on a test specimen mounted in assembly 202. Nozzle 203 is directly connected through flexible hose 103 to a source of high pressure air which may be generally in the range of 5 to 30 p.s.i.g. and preferably in the range of 10 to 20 p.s.i.g. Nozzle 204 is directly connected through line 104 to a source of abradant grit. The velocity pressure of the air passing through the nozzle 203 serves to draw the grit into fitting 206 so. that the abradant is mixed with air as it enters the main nozzle 205. Fitting 206 is mounted in a suitable way to support member 102 which is attached to a wall of the enclosure (100 of FIGURE 1). Nozzle 204 is preferably disposed at an angle to the flow from nozzle 203 as shown in the drawings to assist in aspirating the abradant and should be located between the outlet of nozzle 203 and the inlet of nozzle 205.

The main nozzle may typically be made of any hard material. Hardened steel and boron carbide have been used successfully. The material used, in order to be practical, needs to be able to withstand the abrasive action of the high pressure abradant and air stream passing through it for many hours of testing without the bore being enlarged significantly by erosion to disturb the test results. A molded boron carbide, sold commercially by Norton Co. of Worcester, Mass., and known by their trademark Norbide, has been used with great success. The molded Norbide nozzles are able to withstand the abrasive action of the grit used in the tests.

The main nozzle is held securely in fitting 206 by means of a shoulder 207 which engages the fitting at one end and by a retaining ring 208 at the other end. A nozzle approximately 2 inches long and ¼ inch in diameter has been used with good results. The nozzle should be able to produce generally laminar flow and in this embodiment does so due to its great length in relation to its diameter. To further encourage laminar flow, one end of the nozzle has a cone shaped portion 209.

Located above the nozzle assembly, and securely attached to support 102, is the specimen holder assembly 202. The distance this is away from the main nozzle discharge may vary, but the sample may typically be located about ¾ to 2 inches from the discharge. This distance is preferably from about ⅜ inch to about 1 inch to keep down the pressures needed to maintain flow.

The holder assembly comprises typically a first clamp 210 and a second clamp 211. The specimen to be tested 212 is placed between these two clamps. A gasket 213, typically made of soft rubber, is interposed between the clamps so that a seal is produced and the specimen held securely. Since the fabric to be tested is ordinarily limp, it is important to securely clamp the specimen about the portion which is struck by the abrasive particles. Effective metal to metal clamping is difficult; and without the gasket the specimen would have a tendency to sag— resulting in flexing when the air stream impinges against it.

The first clamp has a through hole in the shape of a truncated cone. This construction assists in carrying off the abradant after it strikes the sample and discourages the spent abradant from reentering the air stream of the main nozzle and repeatedly striking the specimen.

The second clamp 211 has a chamber 214 in it which lies above the sample. The chamber is connected to a manometer (not shown) through two pressure taps 215 and 216. Tap 215 is a velocity pressure tap and tap 216 is a static pressure tap. Before the abradant breaks through the specimen, the pressure sensed by the two taps is about the same. Then as breakthrough occurs, the readings rather abruptly change, the velocity pressure tap showing a much higher pressure due to the impingement on it of the air stream from the main nozzle. The static tap reading remains generally the same as before the breakthrough. The second clamp may be made of Plexiglas or a similar clear material to allow visual observation of the specimen failure.

Referring again to FIGURE 1, the flexible hose lines 103 and 104 which carry air and abradant are shown. The air line 103 passes through the side wall of the enclosure and thence through an air cleaner 107, a filter 108, a pressure regulator 109 and eventually to a source of compressed air shown in phantom lines as 110. Although air is the medium used in this description, any gas could be used successfully so long at it was not unduly toxic or corrosive. For example, Freon dichlorodifluoromethane or carbon dioxide could be used. A gas is preferable but a liquid could be utilized where it is desirable to soften the fabric or where some special effect is desired. Where liquid is used problems of exhausting the chamber would not be present, but no basic changes in the apparatus would be required—pumps would be used to maintain pressure and instead of the hopper recirculator (hereinafter described) some sort of separating chamber would have to be used. Line 104 carries a fine abradant grit (in an air stream) to the holder. The line extends from the holder through the side wall of the enclosure, and eventually to a source of abradant 106 which may in some cases be recirculated abradant.

The enclosure 100 may typically be made of any suitable material such as sheet metal and should typically have a viewing means, for example, a porthole in the side or top. The chamber stands above the laboratory floor on supports. The top should be hinged for easy access and should be able to be securely closed and opened with relative ease. Some sort of quick disconnect clamps should be utilized. The enclosure is exhausted to outdoor ambient through a large pipe 111. The exhaust system includes a fan 112 which is located in the exhaust pipe. The fan serves to draw a slight vacuum in the enclosure 100 which prevents abradant particles used in the apparatus from being blown about the laboratory room. There is no standard size for the enclosure but it should be large enough to still the air so that the abradant falls (due to gravity) and is not pulled out the exhaust. An enclosure as small as about 1' x 1' x 1' has been used successfully.

Preferably the enclosure has a bottom which converges at an opening' For ease of working within the enclosure, an expanded metal grill 113 may be included. The abradant grit, after striking the test specimen, falls by gravity through the metal grill and into some sort of receptacle.

The abradant grit may be recirculated through a suitable means having the capability of separating those particles which have broken and become smaller than the desired size. One means for recirculating the abradant is shown in FIGURE 1. The recirculation system may typically include a shake-table trough 114 located beneath the opening at the bottom of enclosure 100, a funnel 115 positioned at one end of the trough, a reservoir 105 and associated lines and fittings 116.

Abradant falling from the enclosure drops onto a wire mesh screen 117 forming a false bottom in the trough which is equipped with a motor 118 so connected to the trough that it becomes a shake-table. The mesh is standard wire which corresponds to ASTM specifications; for example, a number 40 indicates openings of .0165 inch, a number 30 openings of .0234 inch, and a number 50 openings of .0117 inch. As the grit falls from the enclosure into the hopper, the shaking action causes the smaller particles which have been created due to breaking of the larger particles and which are undesirable, to fall to the bottom of the hopper from whence they are discarded. The larger particles, which have not been broken up and which therefore are still usable, progress to one end of the screen which may be slanted to facilitate movement of the grit and fall into funnel 115. A suitable means 119 such as an aspirator feed system, is used to carry the grit from the funnel to reservoir 105 from whence it is drawn as described above.

Figure 3:
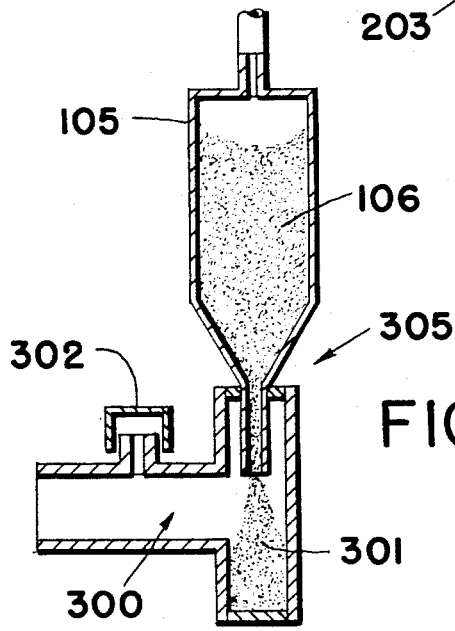
FIGURE 3 is a detail of an abradant feeding means constructed in accordance with the invention.

The details of one type of reservoir is shown in detail in FIGURE 3. The reservoir has a funnel shaped bottom which allows the abradant which is to be recirculated, or which has been fed externally, to fall into a feeding means designated generally as 305. The feeding means assists in assuring constant feeding of the abradant to the main nozzle (205 of FIGURE 2).

The feeding means includes a T fitting 300 with the leg of the T being operatively connected to nozzle 204 (of FIGURE 2). As shown in FIGURE 3, the abradant falls into the cap of the T and is drawn off from the neat pile 301 due to the suction created by the venturi effect in the nozzle. An air bleed 302 is located in the leg of the T. This arrangement assures the even draw which would not be readily obtainable were the grit to be aspirated directly from the receptacle. Regulating of abradant feed is by means of the bleed opening and the vacuum pressure applied to draw the abradant particles from the fitting.

It will be appreciated by one skilled in the art that a variety of means might be used to provide the recirculating and feeding functions described herein. For example, a cyclone chamber might be utilized to assist in separating out the undersized abradant particles, the larger particles being drawn from the cyclone chamber for recirculating.

Glass beads were first used as the abradant but found not to be very good because rather than staying round they chipped and became sharp so that their ability to abrade changed drastically. It was initially thought that the glass beads would either stay round or pulverize to a fine powder. However, this was found not to be the case. Silicon carbide was found to be usable and best results have been obtained using a silicon carbide grit with an average particle size such that 100% of the particles will pass through a number 30 mesh screen. For recirculation of such grit, a number 50 mesh screen has been used effectively in the vibratory feed trough. The sizing of these particles corresponds generally to a number 46 Department of Commerce sizing which specifies that 100% will pass through a number 30 mesh screen, between 10 to 30% is retained on a number 40 screen and 40% or more is retained on a number 45 mesh screen. The mesh sizes conform to ASTM standards, for example: Number 40 has a .0165 inch openings, a number 30 has .0234 inch openings and number 50 has .0117 inch openings. It can be seen then that, for example, when a number 50 mesh screen is used in the vibratory hopper, most of the particles passing through the screen will be those particles that have broken and become smaller.

It is anticipated that a variety of sizes of grit may be used successfully; but best results require that any recirculated particles be generally the same size. Typically an average particle size of from about 150 microns to 1200 microns may be used. An average particle size of from about 300 microns to about 600 microns is preferable.

It has been stated that one of the advantages of the invention is that a test can be performed in less time than on present machines. One reason for this is that the specimen does not need to be specially prepared except, for example, a postcured fabric specimen where one would want to cure the specimen to the extent that the fabric would have a cure in actual practice. One might want to wash before or during testing to more closely approximate wear conditions. However, in the case of previous methods, the practice was to condition the fabric to a particular moisture content before it was tested. In the present invention, the jet of air coming out of the main nozzle (205 of FIGURE 2) is conditioned by the filters and dryers so that the air impinging on the specimen serves to condition the specimen. No moisture preconditioning is required. Typically, approximately four hours of temperature and humidity conditioning is used in most known tests. Further, in some tests it is necessary to weight the samples before and after testing. Often the samples must be cut to a particular size also. However, this is not necessary in the instant case where just any shaped piece can be clamped in the specimen mount. So long as the piece is larger than the hole in the sample mount, there is no problem and it need not be of any particular size or shape.

One problem in a test such as this, is deciding when failure occurs. Some arbitrary point must be set at which failure will be concluded; and that is associated generally with breakthrough by the abradant. In the case of a woven fabric, the warp threads are generally thinner and so will be eroded away before and to a greater extent than the filling threads. It has been found that the manometer reading goes up quite slowly for a time and then takes a rather abrupt change. This abrupt change is considered failure. Where woven cloth is tested, it has been found that generally there is an abrupt change associated with the tearing of the warp threads in the sample. It is not difficult, with a little practice, to spot the point at which the pressure radically changes and real breakthrough occurs. The point of breakthrough corresponds generally to the point where a substantial percentage of the abradant particles begin to pass through the fabric. Breakthrough may be defined, for example, as the point at which woven fibers begin to tear or at which a hole begins to form since these physical changes are associated closely in time with the point at which a substantial portion of the abradant particles directed at the fabric begin to pass through the fabric. Therefore, it is not necessary to exactly pinpoint failure of the fabric in terms of when a particular number of threads break or when a particular size hole is formed although, of course, this could be done.

Stated another way, for a time, as the fabric is being struck by the continuous stream of abradant particles, little change is taking place which could be readily measured although all this time the abradant is wearing away the surface of the fabric. This assumes that the fabric is not initially struck with such a blast that it immediately tears or splits under tensile forces. Once there is the initial fiber breakage or there is a small hole formed, the abradant stream very quickly creates the condition where most of it is passing through the fabric. This time is very brief compared with the time from the first striking of the fabric to the penetration and resultant failure.

Care must be taken to keep the velocity of the abradant stream low enough so that it does not rupture the fabric being tested. Sample runs can be made to determine optimum velocities and amounts of abradant. Best results have been observed by the inventors when the erosion has been slow enough, on the order of 60 to 120 seconds, for easy observation. Further, since it has been found for most fine clothing fabrics to take from about 60 to about 190 seconds for failure to occur with the apparatus and test conditions described above, a slight uncertainty of a second or two one way or the other does not figure dramatically in the test results. Of course, the test could be run so that failure occurs in a shorter time but little would be gained from this.

There are a variety of ways to sense failure of the specimen. One is the pressure taps previously described which are connected to the manometer. Another indicator is the change in noise level in the upper clamp (211 of FIGURE 2). The reason for this noise change is that the stream, at failure, strikes the walls of the chamber (214 of FIGURE 2) after passing through the fabric. Making use of this change in noise, a piezoelectric 220 or similar sensor may be attached to the clamp 211 and connected to a stop-clock 221 or any of a variety of graphical readout devices. Another possible way of sensing is to place a diaphragm, preferably of soft rubber so that the erosion effect is minimized, in the chamber. Again, the point of break-through is sensed by the pressure change.

As has been mentioned previously, the back pressure on nozzle 203 (of FIGURE 2) may be in the range of about 10 to 20 p.s.i.g. Of course, this pressure can vary depending on the configuration of nozzle 205 and on the distance the fabric sample is from the nozzle assembly. It is better to run at low pressures to reduce wear on the apparatus. The flow of abradant through the main nozzle for various tests has been measured. For example, a flow rate of approximately 339 grams per minute of NoH6 silicon carbide abrasive has been found with an 11.3 pounds per square inch gauge working pressure on nozzle 203.

Since there is a requirement that tests be comparable so quality control can be carried out, the apparatus must be capable of being calibrated. This can be accomplished by utilizing as a control, a particular cloth or fabric. The pressure on nozzle 203 is set at some desired level which will allow about 60 seconds to rupture. The abrasive flow rate can be checked periodically to assure that there has been no change in the system which would cloud test comparisons.

A table is shown below which sets out test results for an apparatus in accordance with this invention as well as comparison figures for a test run on two presently known abrasion evaluators. All the tests were run on woven materials although, as has been noted, many types of material including non-wovens may be tested. The samples represent various weights of cloth. The particular cloth used in a particular test is not important since the tests are simply set out to show a comparison. The air passed through the system was dried and filtered as best as could be done with the present commercial dryers and filters. It could be said that the air was clean and substantially dry.

TABLE I

| Sample No. | A Time, seconds | B Strokes | | C Percent wt. loss | D Wt. | E Thickness |
|---|---|---|---|---|---|---|
| | | W | F | | | |
| 1 | 92 | 5,000+ | 1,985 | 2.45 | 3.4 | 9 |
| 2 | 93 | 551 | 639 | 1.83 | 3.8 | 13 |
| 3 | 86 | 583 | 410 | 3.87 | 3.7 | 14 |
| 4 | 45 | 1,082 | 392 | 8.86 | 3.9 | 9 |
| 5 | 68 | 5,000+ | 340 | 11.22 | 3.3 | 8 |
| 6 | 167 | 5,000+ | 5,000+ | 15.10 | 9.2 | 23 |

The first column shows the sample numbers. The second column shows the time in seconds for the test on an apparatus constructed in accordance with the present invention. The total time for all the tests including mounting and demounting of the samples was 6 hours and 18 minutes. The third and fourth columns are results from a machine which counts the number of strokes of an abradant wheel upon both the warp and filling threads to produce a breaking of the threads. The W column shows the warp and F the filling. The total test time for this machine was 12 hours and 57 minutes. The fifth column shows the percent weight loss of the prepared specimen. This test was run on a machine which differs from B in that the percent weight loss of the specimen rather than strokes is measured. The total test time for this machine was 15 hours and 25 minutes. It should be noted that the times do not include temperature and humidity conditioning times. It can be noted from this table, that the time involved in the preparation and testing is considerably less for the apparatus constructed in accordance with the present invention than it is for either of the other two machines. The last two columns D and E show the weight in ounces per square yard and the thickness in mils of the various samples so that an idea can be gotten of the comparative efficiency of the various machines.

The apparatus of this invention has been utilized in a manner that allows correlation between test results and the actual wearability of fabrics.

Table II show comparisons which point up the usefulness of the instant invention in quality control and wear testing of garment cloth.

TABLE II

| Sample No. | Sec., sq. yd., ounces | Rank at start of wear |
|---|---|---|
| 1 | 12.9 | 1 |
| 2 | 17.4 | 3 |
| 3 | 19.9 | 5 |
| 4 | 14.3 | 2 |
| 5 | 30.3 | 4 |
| 6 | 27.4 | 3 |
| 7 | 25.0 | 3 |
| 8 | 28.9 | 6 |
| 9 | 31.5 | 6 |

The table compares tests on an apparatus constructed in accordance with this invention with tests run by washing the cloth.

Column one shows the various samples by number. The samples are fabrics of various constructions and finishes. Column two shows the test results on the apparatus according to the instant invention, with an effort made to compensate for the different fabric weights. This column is to be compared with column three which ranks the samples according to which were the earliest to show wear. For example, sample 1 was first to show wear, sample 4 was the second to show wear, etc.

In a typical sample run, a fabric sample is clamped between clamps 210 and 211 (of FIGURE 2). The air pressure is then turned on and a clock started when the abradant first strikes the specimen. The manometer is viewed and the clock is stopped at the point of failure of the specimen. The specimen is then removed from the clamps, concluding the test. It can be seen that the whole thing is quite simple and aside from getting used to reading the manometer, the procedure requires little or no expertise on the part of the operator.

Although the present invention has been described with reference to specific apparatus, it will be appreciated by a person skilled in the art that a wide variety of changes may be made without departing from the scope of this invention. For example, certain features of the apparatus may be used independently of others and equivalents may be substituted for the apparatus and method steps, all within the spirit and scope of the invention.

We claim:

1. The method of testing for abrasion resistance comprising the steps of: (a) taking a limp piece of fabric; (b) clamping the piece firmly about a line which encloses a portion of the piece, the portion being unobstructed at its opposing faces by the clamping; (c) striking one side of the unobstructed portion continuously with high-velocity abradant particles; (d) sensing the time required for the particles to break through the body of the fabric; and (e) recording the time sensed for purposes of permanent visual readout.

2. The method of claim 1 wherein the step of striking the piece is carried out with abradant particles in the range of approximately 300 microns to approximately 600 microns in size.

3. The method of claim 1 wherein the step of striking the piece is carried out with abradant particles in the range of approximately 150 microns to approximately 1200 microns in size.

4. An apparatus for testing the abrasion resistance of a fabric comprising: a specimen holder; means located adjacent the holder for continuously directing high velocity abradant particles at one surface of the fabric, said directing means including a discharge nozzle, a housing partially enclosing said discharge nozzle, a second nozzle connected to the housing upstream of said discharge nozzle and connected to a source of high pressure gas, and a third nozzle connected to the housing between the outlet of said second nozzle and the inlet of said discharge nozzle and connected to a source of abradant particles, the second nozzle having its outlet directed generally at the inlet of said discharge nozzle; means for recirculating the abradant to the directing means after the abradant has struck the fabric; a stilling chamber enclosing both said directing means and said specimen holder; and means for recording the time required for the abradant particles to break through the fabric.

5. The apparatus of claim 4 wherein said specimen holder includes first and second clamp means and gasket means located between the clamp means; and said first clamp means having a chamber and said second clamp means having a through hole therein.

6. The apparatus of claim 4 wherein said recirculating means includes first and second receptacles, an opening defined by said stilling chamber at the bottom thereof, a vibratory hopper located beneath the opening, the hopper including a trough, and a wire mesh screen defining a false bottom so that the portion of the used abradant not falling through the wire is emptied into the first receptacle, means for carrying the abradant from said first receptacle to said second receptacle, and means for passing the abradant from said second receptacle to said abradant directing means.

7. The apparatus of claim 4 wherein the observing means includes a piezoelectric element attached to the specimen holder and a read-out means operatively connected to the piezoelectric element.

8. The apparatus of claim 4 wherein said specimen holder includes first and second clamp means, and gasket means located between the clamp means; and said first clamp means having a chamber and said second clamp means having a through hole therein.

9. The apparatus of claim 4 wherein said recirculating means includes a receiver, an opening defined by said stilling chamber at the bottom thereof, a vibratory hopper located beneath the opening, the hopper including a trough, and a wire mesh screen defining a false bottom so that the portion of the used abradant not falling through the wire is emptied into the receiver, means for carrying the abradant from said receiver to said receptacle.

10. An apparatus for testing abrasion resistance of a fabric comprising: a specimen holder carrying the fabric and adapted to clamp the piece firmly about a line which encloses a portion of the piece so that the portion is unobstructed at its opposing faces by the clamping; a receptacle carrying abradant grit; means connected to said receptacle and located adjacent to the holder for continuously directing said abradant on one surface of the fabric at a high velocity; a stilling chamber enclosing said holder and said directing means; and means for recording the time required for the abradant particles to break through the body of the fabric.

References Cited

UNITED STATES PATENTS

| | | | |
|---|---|---|---|
| 2,251,681 | 8/1941 | Hathaway et al. | 73—7 |
| 2,323,175 | 6/1943 | Young et al. | 73—7 |
| 2,628,456 | 2/1953 | Berg | 51—8 |
| 2,712,751 | 7/1955 | Bracco et al. | 73—7 |
| 2,721,473 | 10/1955 | Allen et al. | 73—7 |
| 2,907,200 | 10/1959 | Roberts et al. | 73—7 |
| 2,976,716 | 3/1961 | De Haven | 73—7 |
| 3,179,025 | 4/1965 | Schur | 51—8 XR |
| 3,229,498 | 1/1966 | Oakes | 73—7 |

LOUIS R. PRINCE, *Primary Examiner.*

JEFFREY NOLTON, *Assistant Examiner.*

U.S. Cl. X.R.

51—8